Jan. 29, 1963  J. H. SPENCER ETAL  3,076,167
MANUAL BY-PASS FOR METER SOCKET
Filed March 28, 1960  2 Sheets-Sheet 1
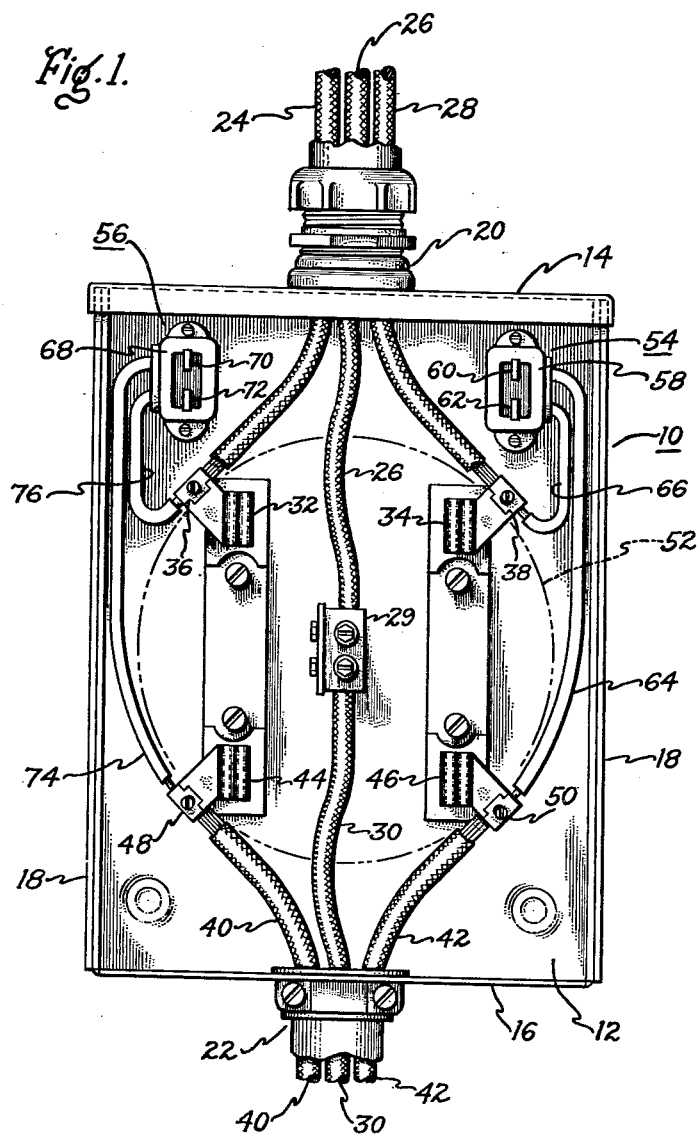
Inventors,
John H. Spencer,
Robert Brackett,
by Francis K. Doyle
Their Attorney.

Jan. 29, 1963   J. H. SPENCER ETAL   3,076,167
MANUAL BY-PASS FOR METER SOCKET
Filed March 28, 1960   2 Sheets-Sheet 2
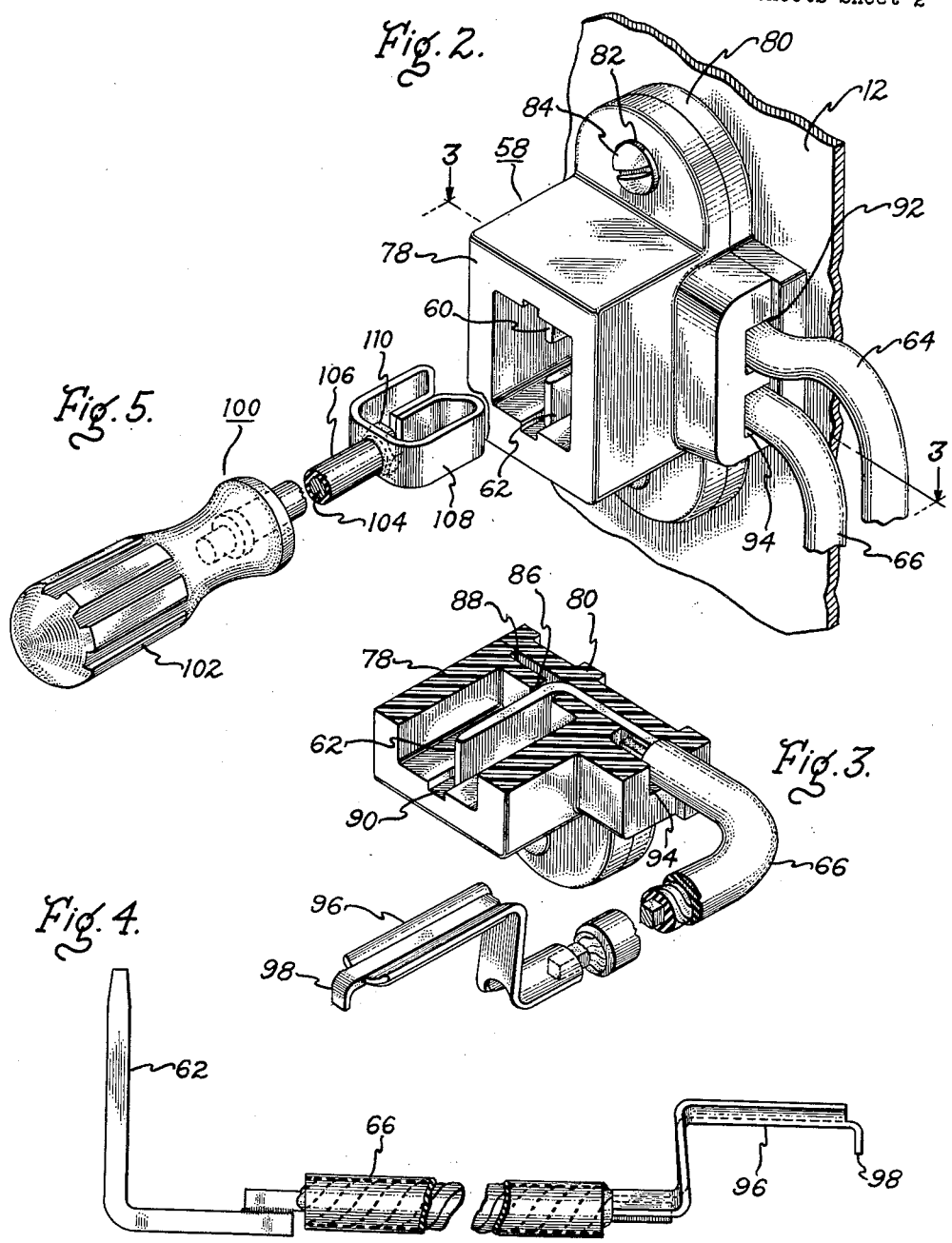
Inventor,
John H. Spencer,
Robert Brackett,
by Francis K. Doyle
Their Attorney.

United States Patent Office 3,076,167
Patented Jan. 29, 1963

3,076,167
MANUAL BY-PASS FOR METER SOCKET
John H. Spencer, Gonic, N.H., and Robert Brackett, Berwick, Maine, assignors to General Electric Company, a corporation of New York
Filed Mar. 28, 1960, Ser. No. 17,807
3 Claims. (Cl. 339—19)

This invention relates to meter sockets and, more particularly, to meter sockets being provided with a manual by-pass means to prevent interruption in service.

In today's electrical industry various meters, for example, watthour meters, are installed in meter sockets to provide registration and recordation of the uses of electrical energy. These meters are used extensively in industrial plants, various commercial establishments, such as stores, repair shops and the like, and in residences. These meters in general have a very long life, averaging at least 30 years, and during this period it becomes necessary to periodically remove the meters for cleaning, testing, and on occasion for repair. Of course, it also becomes necessary after a period of years to replace various of these meters, either because the life of the meter has expired, or in order to upgrade the electrical service being provided to the particular customer. When these meters are removed from their sockets for any reason, the electrical service provided to the customer must necessarily be interrupted temporarily unless means are provided to temporarily make a connection between the line leads and the load leads apart from the electrical meter.

Various means of providing these temporary connections between the line leads and the load leads are known, and are generally classified in the art as either automatic by-passes or manual by-passes. In the automatic by-pass, a connection is automatically made between the line leads and the load leads by the mere removal of the meter from its socket. In the manual by-pass, the connection between the line leads and the load leads must be manually made before the meter is removed from its socket.

Since, in general, the removal of meters from their socket is very infrequent, the cost of a by-pass device must be very reasonable in order that a utility company can justify its use in a normal installation. Naturally, in those installations where even a short interruption would cause a loss or a hazard to their customer, the utilities would install the by-passes regardless of the cost. Therefore, it can be seen that for the majority of installations a low-cost by-pass is required. Also, to provide for widespread use of such low-cost by-pass, the by-pass must be simple in operation, very efficient, and capable of installation either in the field or in the factory, on new meter sockets. In general, a manual by-pass will best fill these needs.

It will be also apparent, that since a manual by-pass is connected or operated in the meter socket prior to the removal of the meter from its socket, the manual by-pass must be of a type which will be readily noticeable when connected and one which would be almost impossible to leave in the meter socket after the meter has been returned or replaced in its socket. The loss which the utilities would sustain if a manual by-pass were inadvertently left in a meter socket over a long period of time, will appear obvious. Therefore, it is necessary that the manual by-pass be one which will provide a positive indication that the meter is by-passed and prevent the meter cover from being replaced while the meter by-pass is still connected.

It is, therefore, an object of this invention, to provide a manual by-pass which is low in cost, electrically safe, and which may be readily installed in meter sockets.

It is a further object of this invention to provide a manual by-pass for meter sockets which will provide a positive indication that the meter of the meter socket has been by-passed.

It is a still further object of this invention to provide a manual by-pass for meter sockets which is simple in operation and which may be readily installed either in the field or in the factory.

In carrying out this invention in one form, a manual by-pass for a meter socket is provided in which a body of electrical insulation material is attached to the base plate of the meter socket. A pair of electrical terminals are mounted within the insulated body and a pair of insulated conductors are connected between the terminals and a line terminal and a load terminal of the meter socket. Connecting means are provided to connect the two terminals mounted on the insulated body so that upon application of the connecting means the line terminal and load terminal of the meter socket will be electrically connected together, thereby effectively by-passing the meter which would be mounted within such socket terminals.

The invention which is sought to be protected will be particularly pointed out in the claims which are appended to this specification. However, it is believed that the manner in which the various objects hereinbefore set forth, as well as other objects and advantages, are obtained will be more readily understood from the following description taken in connection with the accompanying drawings in which:

FIG. 1 is a front view of a meter socket with the cover removed showing one form of the by-pass of this invention;

FIG. 2 is a detailed view showing the meter by-pass in one form;

FIG. 3 is a view taken on the line 3—3 of FIG. 2 showing the preferred form of the invention in more detail;

FIG. 4 is a showing of the terminals utilized in this invention and the manner in which they are connected to the flexible lead in forming the by-pass of this invention; and FIG. 5 is a perspective view showing one form of a shorting link which may be utilized in this invention.

Referring now to the drawings in which like numerals are used to indicate like parts throughout, and in particular with reference to FIG. 1, there is shown one form of the manual by-pass of this invention as connected to a meter socket. In the illustration of FIG. 1, the meter socket is shown as a four terminal single-phase socket of the ringless type. However, it will be understood that the manual bypass arrangement of this invention is suitable for use in sockets having other terminal arrangements and also could be used with meter sockets requiring sealing rings if separate access covers or compartments were provided. In the drawing, the meter socket is generally designated 10, having a base or back wall 12, top and bottom walls 14 and 16 respectively, and side walls 18. An opening 20 is provided in the top wall for the insertion of the line leads from the distribution point of the electric utility while in the bottom wall an opening 22 is provided for the load leads to exit from the meter socket to the branch circuits of the customer.

The line leads from the utility comprise three leads 24, 26 and 28, the lead 26 going to a neutral connector 29 in the center of the socket 10, where it connects to the neutral or common lead of the load line 30 going to the customer's branch circuits. The hot leads 24 and 28 also enter the meter socket through the opening 20, the line lead 24 being connected to a meter socket terminal 32 while the line lead 28 is connected to the meter socket terminal 34. The terminals 32 and 34 are generally referred to as the line terminals. As is understood by those skilled in the art, the line leads 24 and 28 are connected respectively to the line terminals 32 and 34 by means of the socket terminal connectors 36 and 38 respectively. The load leads for the meter socket are leads 40, 30 and 42, leads 40 and 42 being the hot leads to the customer's branch circuits. The leads 40 and 42 are respectively connected to the meter socket load terminals 44 and 46 by means of the socket terminal connectors 48 and 50 and leave the meter socket 10 by the opening 22 for connection to the various branch circuits of the customer.

As is well understood by those skilled in the art, the connection between the line terminals 32 and 34 and the load terminals 44 and 46 is made by means of a socket meter. This meter may be a socket type watthour meter, which is inserted into the socket with the blades or posts of the meter being inserted into the various line terminals and load terminals. The connection between, for example, line terminal 32 and load terminal 44 is then made through the meter which is placed therein, such that the electrical energy which is extracted from the lines 24, 26 and 28 is registered or recorded in the meter. The outline of a socket-type watthour meter is shown by the phantom lines 52 in FIG. 1.

When it becomes necessary to remove the meter indicated by the phantom line 52 in FIG. 1, it is desirable that the meter be removed without interrupting the customer's service. In order to provide such continuity of service with the meter being removed, it is necessary that a by-pass arrangement be provided for connecting the various line terminals to the various load terminals when the meter is removed. In order to provide such connection, a manual by-pass is shown, one manual by-pass 54 for the line terminal 34 and load terminal 46, and a manual by-pass 56 for the line terminal 32 and load terminal 44. The by-pass 54 is provided with an insulating body 58 and mounted within such insulating body are terminal means 60 and 62, the terminal means 60 being connected by a flexible lead 64 to the socket terminal connection 50 for the load terminal 46 while the terminal means 62 is connected to the socket terminal connector 38 of line terminal 34 by means of flexible lead 66. The by-pass 56 comprises an insulated body 68 and has mounted therein two terminal means 70 and 72. The terminal means 70 is connected to the socket terminal connector 48 of the load terminal 44 by means of a flexible lead 74 while the terminal means 72 is connected to the socket terminal connector 36 of the line terminal 32 by means of flexible lead 76. In this manner, the terminal means 60 and 62 can be inter-connected to thereby connect the line terminal 34 to load terminal 46 while terminal means 70 and 72 can be interconnected to thereby connect line terminal 32 to load terminal 44, thus effectively by-passing the meter connection and allowing the meter to be removed from the meter socket 10 without interrupting the electrical service.

The construction of by-pass means 54 and 56 is more clearly shown in FIGS. 2 and 3 of the drawing and reference will now be had to such figures to provide a more detailed description of the preferred embodiment of the invention. While only one of the by-pass by-pass devices will be described, that of by-pass 54, it will be readily understood that by-pass 56 is constructed in a similar manner. The body 58 of by-pass 54 is formed in two parts, the top portion 78 and the base portion 80. The top portion 78 and base portion 80 are provided with complementary holes 82 through which mounting screws 84 are inserted to firmly attach the body 58 to the base 12 of the meter socket 10. The terminal means 60 and 62 snugly fit within the top portion 78 of the insulating body 58 of the by-pass device 54, in side-by-side spaced relation, with the upper portion of each of terminals 60, 62 parallel with the axis of the opening in body 58, as more clearly shown in FIG. 3. In FIG. 3 it is shown that the top portion 78 of the body 58 is provided with an opening 86 in the bottom thereof, cooperating with a slot means 88 formed adjacent thereto and a slot means 90, on the other side of opening 86, perpendicular to slot means 88. These slots as so constituted, that the terminal means 62, which is formed at a right angle, or L-shaped, fits into slot 88 and, through the opening 86, into slot 90 formed along one of the inner sides of the top portion 78. When the two portions 78 and 80 are mounted together on the base portion 12 of the meter socket 10, the terminal means 62 and 60 are thereby held firmly fixed within the meter by-pass body 58. Enlarged openings 92 and 94 are formed at the ends of the slots, for example, slot 88 shown in FIGURE 3, to accommodate the insulated portion of the flexible leads where they are attached to the terminal means 60 and 62.

The form of terminal means and clips connected to flexible leads, as utilized in this preferred embodiment of the invention, are more clearly shown in FIGURE 4, where the right-angled terminal means, for example, terminal means 62, is shown. One end of flexible lead 66 is firmly attached to the bottom portion of terminal means 62 in any desired manner, as, for example, by brazing. The opposite end of the flexible lead is provided with a terminal clip portion generally indicated as 96, the terminal clip portion 96 being attached to such opposite end of the flexible lead 66 in any desired manner, for example, brazing. The terminal clip means 96 is designed to fit within the standard socket terminal connector 38, and is formed with a small hooked portion 98 to hold the treminal clip 96 within the socket terminal connector 38 while the line lead 28 is being connected thereto. The terminal clip is shaped in the form of the base of the socket terminal connector 38 and is made of thin conductive material so as to require as little space as possible within the socket terminal connector 38. It should be understood that the hooked portion 98 is sufficiently pliant that it may be readily bent under the socket terminal connector to hold the terminal clip 96 firmly in place while the desired leads are being connected to such connector. Thus, it can be seen that the flexible leads 66 and the other leads 64, 74, and 76 which are formed in a similar manner, are designed to be readily mounted in the meter socket, either in the field or in the factory during production of such meter sockets.

In order to provide the desired connection means between the terminal means 60, 62 or terminal means 70, 72 of the by-pass means 54 and 56, a shorting link is provided in the manner shown in FIG. 5 of the drawing. The shorting link, generally designated 100, is formed with an insulated handle 102, a metallic shaft 104, provided with electrical insulation 106, and a spring clip connecting member 108, of electrical conducting material. The spring clip 108 of the shorting link 100 is shown in the form of a standard meter socket terminal jaw and is utilized in the preferred embodiment due to its time-tested reliability in meter sockets and its general availability at reasonable manufacturing costs. The spring clip 108 is mounted or attached to the steel or metallic shank 104 in any desired manner, such as, for example, having the end of the metallic shank 104 threaded and providing a nut means 110 for connecting the spring clip 108 to the shank 104. In this manner of attachment, the shorting link may be utilized a number of times, for connecting the terminal means 60, 62 or 70, 72 and, when the spring clip 108 becomes excessively worn, it can easily be replaced by attaching a new spring clip to the handle by means of the nut 110. The shank 104 with its insulation means 106, is made of a sufficient length such that when the spring clip 108 is inserted within the body 58 to connect the terminal means 60, 62, the handle 102 of the shorting link 100 will extend sufficiently beyond the sides 18 of the meter socket 10 to prevent the replacement of the cover without first removing the shorting link. In this manner a positive indication of the by-pass is provided and it is relatively impossible to replace the meter socket cover without first removing the by-pass shorting link.

The use of the manual by-pass of this invention will be evident from the foregoing description. The by-pass body 58 and 68 are attached to the base 12 of the meter socket by means of the mounting bolts 84, either in the field or in the factory, and the various flexible leads are connected to their respective socket terminal connectors in the manner hereinbefore described. Then when it is desired to by-pass the meter prior to its removal from the meter socket, the shorting links 100 are inserted in the opening of the by-pass means 54 and 56, such that the spring clip 108 makes a firm contact with the terminal means 60, 62 and terminal means 70, 72, thereby effectively connecting the respective line terminals to their load terminals to effectively by-pass the meter. The meter may then be withdrawn from the socket without interrupting the customer's service.

While there has been shown and described a preferred embodiment of this invention, it will be well understood by those skilled in the art that various changes may be made in the body of the by-pass in the various connections in the by-pass and the socket terminal connectors, as well as in the form of the shorting link without departing from the scope of the invention hereinbefore disclosed. Therefore, it should be understood that the preceding description is for purposes of illustration only and that the invention is not to be considered as limited thereby, but rather it is intended to cover all such modifications as fall within the true spirit and scope of this invention as defined in the appended claims.

What is claimed as new and which is desired to be secured by Letters Patent of the United States is:

1. In a meter socket having a plurality of line and load terminals attached to the base plate thereof, a manual by-pass device for providing an electrical by-pass from the line terminals to the load terminals comprising; a pair of bodies of electrically insulating material, each of said bodies being mounted directly on the base plate of the meter socket apart from the plurality of line and load terminals, each of said bodies having an opening therein, a pair of electrical terminals mounted in each of said bodies, said pair of electrical terminals being in side-by-side spaced relation and formed with a portion thereof parallel to the axis of the opening in each of said bodies, two pair of flexible insulated conductors, each pair of conductors being attached to the terminal means in each of said electrically insulated bodies, one end of each pair of said two pair of conductors being connected to one of said terminals within said body, and the other ends of each pair of said electrical conductors being connected to terminals in said socket, one of said other ends of each pair of electrical conductors being connected to a line terminal, and the remaining end of said other ends of each pair of electrical conductors being connected to a load terminal, a shorting link for connecting each pair of said terminals together within said body, said shorting link comprising a spring clip means contacting said side-by-side spaced terminals, whereby the line terminals are connected to their respective load terminals to provide the desired manual by-pass.

2. In a meter socket comprising a plurality of line and load terminals connected to the base plate thereof a manual by-pass for providing an electrical by-pass from the line terminals to the load terminals, comprising a first body of electrical insulating material said first body being mounted directly on the base plate of a meter socket apart from the line and load terminals thereof, a second body of electrical insulating material, said second body of electrical insulating material being mounted directly to the base plate of the meter socket apart from the line and load terminals thereof and apart from said first body, each of said first body and said second body having an opening therein a first pair of electrical terminals mounted in said first body, a second pair of electrical terminals mounted in said second body, said first pair of electrical terminals and said second pair of electrical terminals being in side-by-side spaced relation in said bodies and being formed with a portion thereof parallel to the axis of the opening in each of said bodies, a first pair of insulated conductors, each of said conductors having one end thereof electrically connected to one of said terminals of said first pair of terminals, a second pair of electrical insulated conductors, each of said second pair of conductors having one end thereof electrically connected to one of said terminals of said second pair of terminals, the other ends of said first pair of electrical conductors being connected to terminals in said socket, one of said other ends of said first pair of electrical conductors being connected to a first line terminal and the remaining of said other ends of said first pair of electrical conductors being connected to a first load terminal, the other ends of said second pair of electrical conductors being connected to terminals in said socket box, one of said other ends of said second pair of electrical conductors being connected to terminals in said socket box, one of said other ends of said second pair of electrical conductors being connected to a second line terminal and the remaining of said other ends of said second pair of electrical conductors being connected to a second load terminal, a pair of shorting links, one of said pair of shorting links being connected to said first pair of terminals and the other of said pair of shorting links being connected to said second pair of terminals each of said shorting links comprising a spring clip means contacting said side-by-side spaced terminals whereby an electrical connection is made between said first line terminal and first load terminal through said first pair of terminals, and an electrical connection is made through said second line terminal and said second load terminal through said second pair of terminals.

3. A manual by-pass in a meter socket as claimed in claim 2 in which said first pair of electrical terminals and said second pair of electrical terminals are L-shaped, said first body and said second body comprise two parts having cooperating means in the form of slots for each terminal, the slot in one of said two parts being perpendicular to the slot in the other of said two parts for securing within each said body said pair of electrical terminals.

References Cited in the file of this patent
UNITED STATES PATENTS

| | | |
|---|---|---|
| 1,418,650 | Johnson | June 6, 1922 |
| 2,462,867 | Hubbell | Mar. 1, 1949 |
| 2,488,113 | Barocas | Nov. 15, 1949 |
| 2,592,299 | Lewis | Apr. 8, 1952 |
| 2,825,879 | Moore | Mar. 4, 1958 |

UNITED STATES PATENT OFFICE
CERTIFICATE OF CORRECTION

Patent No. 3,076,167            January 29, 1963

John H. Spencer et al.

It is hereby certified that error appears in the above numbered patent requiring correction and that the said Letters Patent should read as corrected below.

Column 6, lines 32 to 34, strike out "one of said other ends of said second pair of electrical conductors being connected to terminals in said socket box,"

Signed and sealed this 3rd day of September 1963.

(SEAL)
Attest:

ERNEST W. SWIDER
Attesting Officer

DAVID L. LADD
Commissioner of Patents